UNITED STATES PATENT OFFICE.

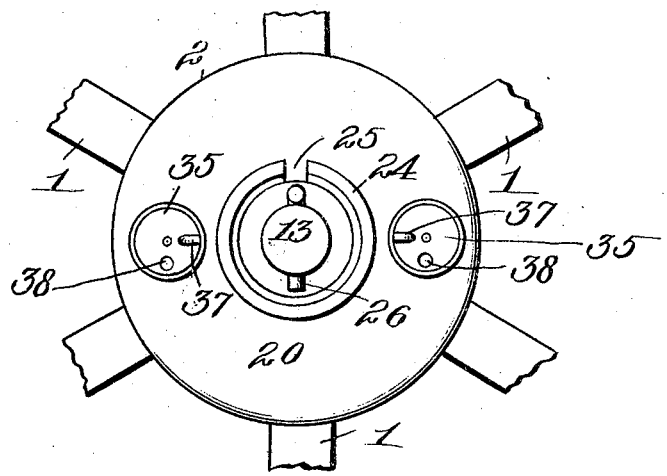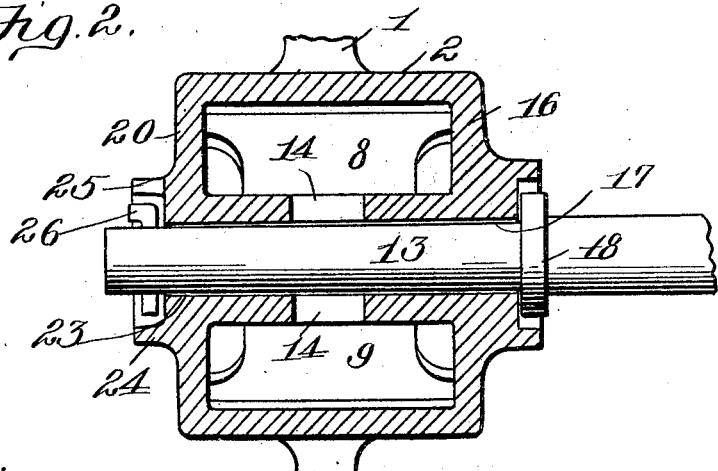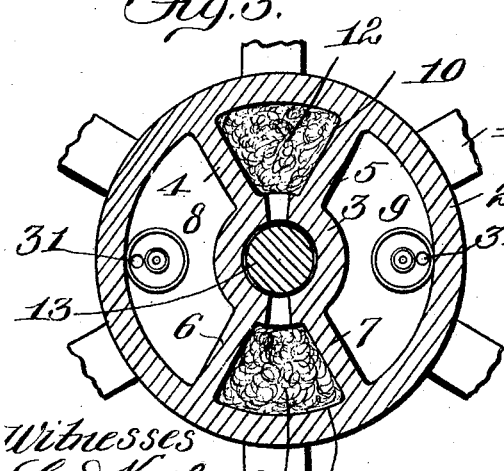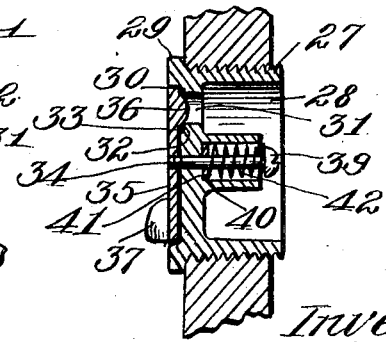

JOHN K. LIGHTFOOT, OF CUMBERLAND, MARYLAND, ASSIGNOR OF ONE-HALF TO IRWIN W. HOLMES, OF CUMBERLAND, MARYLAND.

SELF-LUBRICATING WHEEL.

No. 802,935.        Specification of Letters Patent.        Patented Oct. 24, 1905.

Application filed September 20, 1904. Serial No. 225,290.

*To all whom it may concern:*

Be it known that I, JOHN K. LIGHTFOOT, a citizen of the United States, residing at Cumberland, in the county of Allegany and State of Maryland, have invented new and useful Improvements in Self-Lubricating Wheels, of which the following is a specification.

This invention relates to a self-lubricating wheel, and it is also applicable for use in connection with pulleys.

The invention aims to construct a self-lubricating wheel which when in motion will prevent the formation of any suction, thereby obtaining the lubricating of the axle in a uniform manner, or, in other words, to so construct the wheel to prevent the lubricant from rapidly discharging from its reservoir, or, in other words, to so construct the wheel that the lubricating material will be fed to the axle in a uniform manner.

The invention further aims to construct a self-lubricating wheel which will prevent a waste of the lubricant no matter how fast the wheel is revolving, as from the construction of the wheel hereinafter described means is provided to prevent suction, so that the lubricant will be fed to the journal or axle in a uniform manner.

The invention further aims to construct a self-lubricating wheel with a new and novel means to permit of supplying the lubricating material to the lubricating-reservoir, the whole forming a part of the wheel.

The invention further aims to construct a self-lubricating wheel which shall be simple in its construction, strong, durable, efficient in its use, feeding the lubricant in a uniform manner, and comparatively inexpensive to manufacture.

With the foregoing and other objects in view the invention consists in the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, and wherein like reference characters denote corresponding parts throughout the several views, in which—

Figure 1 is an elevation. Fig. 2 is a longitudinal section. Fig. 3 is a transverse section, and Fig. 4 is a sectional detail of the inlet-valve mechanism.

In the drawings forming a part of this specification the invention is shown for the purpose of illustration as applied to the self-lubricating wheel; but it is evident the invention can be adapted for use in connection with pulleys or other parts of the machiney for which it is applicable.

Referring to the drawings by reference characters, the spokes 1 of the wheel terminate at their inner ends in an enlarged casing 2. Although the term "spoke" is used, yet in some instances—for example, in car-wheels—spokes are dispensed with and a web is used instead. Therefore the term "spoke" applies to web also. The enlarged casing 2 is connected with the hub 3 of the wheel through the medium of the integral partitions 4, 5, 6, and 7. The partitions 4 5 and 6 7 are arranged closer together than the partitions 4 6 and 5 7. The partitions 4 5 6 7 divide the space between the casing 2 and hub 3 into a pair of lubricant-reservoirs 8 9 and a pair of lubricant-feed chambers 10 11. The reservoirs 8 9 are considerably larger than the chambers 10 11. The chambers 10 11 have a suitable packing 12 placed therein, which it is evident will regulate the flow of the lubricating material from said feed-chambers to the axle 13, and the discharge of the lubricant from the feed-chambers 10 11 is had through the medium of a pair of diametrically opposite rectanglar slots 14, formed in the hub 3. Consequently communication is established between said feed-chambers 10 11 and the axle 13. Communication is had between the reservoirs 8 9 and the chambers 10 11 through the medium of the cut-away end of the partitions 4 5 6 7. These cut-away portions form inlet-openings, and the manner in which these openings are formed will now be referred to.

One end of the casing or sleeve 2 is closed through the medium of a head 16, cast integral therewith and with the hub 3. The head 16 is centrally bored, as at 17, to permit the passage of the axle 13, and on the outer face of said head 16 an integral collar 18 is formed which acts as a dust-guard. The bore 17 in the plate 16 is of the same diameter as the bore on the axle-box. The head 16 forms a portion of the wall of the inlet-openings formed by the cut-away portions at one end of the partitions 4 5 6 7. At the other end of the casing or sleeve 2 a head 20 is formed integral therewith and with the hub 3. The head 20 is centrally bored, as at 23, to permit of the passage of the axle, and said bore 23 is substantially of the same diameter as the bore of the axle-box. Surrounding the bore 23 on the outer face of the head 20 is a collar 24, provided with a slot 25. The collar 24 acts as a dust-guard, and the slot 25 permits of the entrance and removal of the linchpin 26, which is adapted to extend through the axle 13 for retaining the wheel in the axle. The head 20 forms a portion of the walls of the inlets at the other end of the partitions 4 5 6 7.

The head 20 is provided with a pair of diametrically opposite screw-threaded openings 27, extending at an inclination, in each of which is arranged a suitable inlet-valve mechanism to permit the supplying of a lubricant to the reservoirs 10 11. Each of the inlet-valve mechanisms consists of a screw-threaded plug 28, having a flange 29 adapted to arrest the inward movement of the plug 28. The plug 28 is countersunk in the top thereof, as at 30, and is further provided with an inlet-port 31, having the outer end countersunk, as at 32, and upon said countersunk portion is mounted a flexible washer 33. Extending through the plug 28, centrally thereof, is a pin 34, which is fixed at its upper end to the closure-disk 35 for connecting the latter to the plug in the countersunk portion thereof. The lower face of the disk 35 is provided with a protuberance 36, which is adapted to snugly engage in the countersunk portion of the port 31, and thereby close the same. The disk 35 is also provided with a thumb-piece 37 to permit of rotating the disk on its axis, so as to remove the protuberance 36 from the mouth of the port 31 and to also shift the opening 38, formed in the disk to register with the port 31, so that the lubricant can be supplied to the reservoir. The pin 34 carries an abutment at its lower end, as at 39, and also carries an elastic washer 40, abutting against the surface 41, and interposed between the washer 40 and abutment 39 is a compression-spring 42, whose action is to retain the disk 35 in contact with the upper face of the plug 28.

When the lubricating material is supplied to the reservoirs 8 and 9 and the wheel is revolved and the axle or journal is lubricated, the lubrication takes place in the following manner: The partitions, casing, hub, and heads when set up are an integral body. The lubricant will pass through the inlet-openings formed by the partitions and heads into the chambers 10 11, where it will be taken up by the packing and from there fed through the openings in the hub to the axle or journal. By such an arrangement owing to the employment of the packing the same will prevent any suction upon the lubricant in the reservoir, and consequently the lubricant will be fed in a uniform manner, as the packing will take up the lubricant, and from the packing it is discharged upon the axle through the openings in the hub, said openings communicating directly with the chambers 10 11, containing the packing. The lubricant when supplied is not admitted directly into the feed-chambers, but into the reservoir, and from there enters the chambers, most of it through capillary attraction, which is evident. The inlet-valve mechanism prevents the discharge of the lubricant when supplied to the reservoir, and this is evident, as the proturbances of the disk snugly engage in the mouth of the inlet-ports of the plugs.

Having thus fully described my invention, what I claim as new, and desire to secure by Letters Patent, is—

1. A self-lubricating wheel involving a hub having a pair of diametrically opposite openings, a casing surrounding said hub, a series of longitudinally-extending partitions interposed between and connected to the casing and hub forming thereby a pair of diametrically opposite lubricant-reservoirs and a pair of diametrically opposite lubricant-feed chambers, said partitions cut away at each lower corner to establish communication between the chambers and the reservoirs, heads for closing said reservoirs, and an inlet-valve mechanism connected to one of said heads.

2. In a self-lubricating wheel, the combination with a pair of lubricant-reservoirs and a pair of lubricant-feed chambers communicating with the reservoirs and provided with outlets, of an inlet-valve mechanism for said reservoirs, said mechanism consisting of a plug having a port, a washer mounted in the mouth of said port, a closure-disk provided with a protuberance adapted to extend in the mouth of the port and further provided with an opening adapted to communicate with the port, and means for pivotally connecting the disk to the plug.

3. A self-lubricating wheel involving a hub having a pair of diametrically opposite openings, a casing surrounding said hub, a series of longitudinally-extending partitions interposed between and connected to the casing and hub forming thereby a pair of diametrically opposite lubricant-reservoirs and a pair of diametrically opposite lubricant-feed chambers, said partitions cut away at each lower corner to establish communication between the chambers and the reservoirs, and heads for closing said reservoirs and chambers.

4. A self-lubricating wheel involving a hub having a pair of diametrically opposite openings, a casing surrounding said hub, a series of partitions interposed between and connected to the casing and hub thereby forming a pair of diametrically opposite lubricant-reservoirs and a pair of diametrically opposite lubricant-feed chambers, said partitions cut away at each end to establish communication between the chambers and the reservoirs, heads for closing said chambers and reservoirs, one of said heads provided with a pair of openings arranged opposite one end of the reservoirs, a plug in each of said openings and provided with a port, said plug having its outer face provided with a countersunk portion, a disk mounted in said countersunk portion and provided with a protuberance adapted to close said port, said disk further provided with an opening adapted to register with said port, and means for pivotally connecting the disk.

5. A self-lubricating wheel involving a hub having a pair of diametrically opposite openings, a casing surrounding said hub, a series of partitions interposed between and connected to the casing and hub thereby forming a pair of diametrically opposite lubricant-reservoirs and a pair of diametrically opposite lubricant-feed chambers, of less area than the reservoirs, said partitions cut away at each end to establish communication between the chambers and the reservoirs, heads for closing said chambers and reservoirs, one of said heads provided with a pair of openings arranged opposite one end of the reservoirs, a plug in each of said openings and provided with a port, said plug having its outer face provided with a countersunk portion, a disk mounted in said countersunk portion and provided with a protuberance adapted to close said port, said disk further provided with an opening adapted to register with said port, and means for pivotally connecting the disk to the plug.

In testimony whereof I have hereunto set my hand in presence of two subscribing witnesses.

JOHN K. LIGHTFOOT.

Witnesses:
ROBT. SHRIVER,
ROBERT S. SHRIVER.